(12) United States Patent
Koch et al.

(10) Patent No.: US 9,686,914 B2
(45) Date of Patent: Jun. 27, 2017

(54) YIELD MONITORING APPARATUS, SYSTEMS, AND METHODS

(71) Applicant: Precision Planting LLC, Tremont, IL (US)

(72) Inventors: Justin Koch, Deer Creek, IL (US); Michael Strnad, Delavan, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 14/900,047

(22) PCT Filed: Jun. 23, 2014

(86) PCT No.: PCT/US2014/043741
§ 371 (c)(1),
(2) Date: Dec. 18, 2015

(87) PCT Pub. No.: WO2014/205455
PCT Pub. Date: Dec. 24, 2014

(65) Prior Publication Data
US 2016/0143221 A1    May 26, 2016

Related U.S. Application Data

(60) Provisional application No. 61/838,130, filed on Jun. 21, 2013, provisional application No. 62/010,355, filed on Jun. 10, 2014.

(51) Int. Cl.
*G01F 1/30* (2006.01)
*A01D 41/127* (2006.01)
*A01F 12/46* (2006.01)
*G01F 22/00* (2006.01)
*A01D 61/04* (2006.01)
(Continued)

(52) U.S. Cl.
CPC ......... *A01D 41/1272* (2013.01); *A01D 61/04* (2013.01); *A01D 65/02* (2013.01); *A01F 12/46* (2013.01); *G01F 1/30* (2013.01); *G01F 22/00* (2013.01); *G01F 23/2921* (2013.01)

(58) Field of Classification Search
CPC .................................. G01F 1/30; A01D 73/00
USPC ...................................... 73/861.73; 702/156
See application file for complete search history.

(56) References Cited

U.S. PATENT DOCUMENTS 5,173,079 A * 12/1992 Gerrish ................... A01F 12/50
                                                        460/7
5,343,761 A *  9/1994 Myers .................... A01C 7/105
                                                        73/861
5,959,218 A    9/1999 Strubbe
(Continued)

FOREIGN PATENT DOCUMENTS

WO      2013023142 A1    2/2013

*Primary Examiner* — Jewel V Thompson
(74) *Attorney, Agent, or Firm* — Thomas J. Oppold; Larkin Hoffman Daly & Lindgren, Ltd.

(57) ABSTRACT

Apparatus, systems and methods are provided for monitoring yield while harvesting grain. Grain released from paddles on the clean grain elevator chain of a harvester contacts a flow sensor which reports the rate of grain flow through the clean grain elevator. In some embodiments a brush is mounted to the chain and disposed to clean the flow sensor surface. In other embodiments a bucket mounted to the clean grain elevator chain releases grain against the flow sensor at a rate dependent on a grain property.

13 Claims, 19 Drawing Sheets

(51) Int. Cl.
*A01D 65/02* (2006.01)
*G01F 23/292* (2006.01)

(56) References Cited

U.S. PATENT DOCUMENTS

| | | | |
|---|---|---|---|
| 6,272,935 B1 * | 8/2001 | Strubbe | G01F 1/206 |
| | | | 73/861.73 |
| 6,285,198 B1 | 9/2001 | Nelson et al. | |
| 6,460,008 B1 * | 10/2002 | Hardt | A01D 41/1277 |
| | | | 460/1 |
| 6,584,424 B2 | 6/2003 | Hardt | |
| 6,899,616 B1 | 5/2005 | Murray et al. | |
| 2001/0037636 A1 * | 11/2001 | Mitchell | A01D 17/101 |
| | | | 56/330 |

* cited by examiner

YIELD MONITORING APPARATUS, SYSTEMS, AND METHODS

Live or real-time yield monitoring during crop harvesting is known in the art. One type of commercially available yield monitor uses an impact-type mass flow sensor such as that disclosed in U.S. Pat. No. 5,343,761, which is hereby incorporated herein in its entirety by reference. Although such monitors are generally capable of indicating the relative rate of mass flow in the combine during harvesting, they are known to be substantially inaccurate. As the interest and market investment in site-specific farming practices (e.g., variable rate planting and crop input applications) has increased, the need for accurate yield measurements (e.g., to generate accurate spatial yield maps by associating yield measurements with GPS-tracked locations) has become more significant. As such, there is a need for apparatus, systems and methods of accurately measuring mass flow rate of grain while harvesting.

DESCRIPTION

Combine and Yield Sensor

Figure 1:
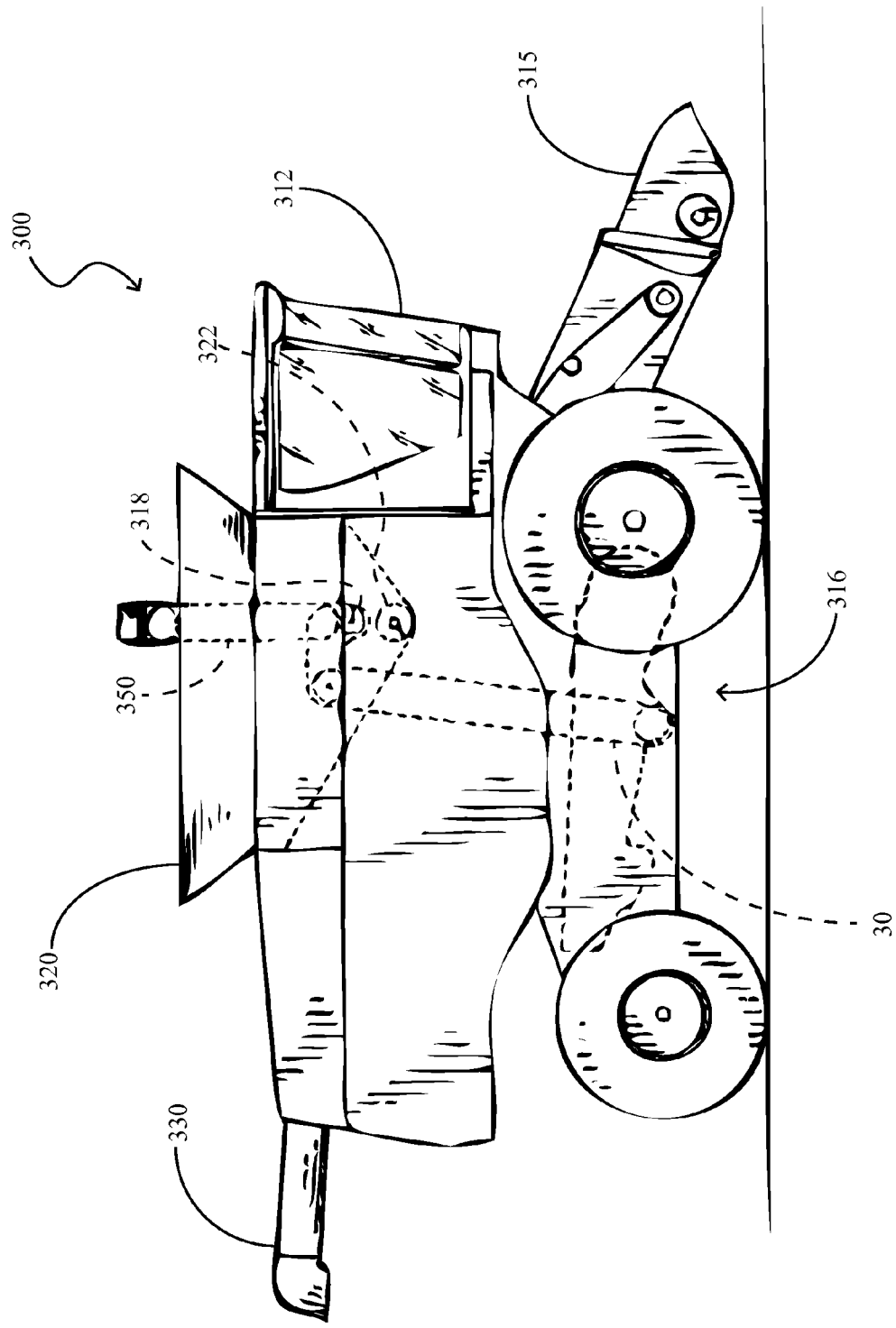
FIG. 1 is a side elevation view of an embodiment of a combine harvester.

Referring now to the drawings, wherein like reference numerals designate identical or corresponding parts throughout the several views, FIG. 1 illustrates a combine 300. As the operator in cab 312 drives the combine 300 through the field, the crop being harvested is drawn through the head 315 into the feeder house 316 where the grain is separated from the other harvested plant material. The separated grain is lifted by a clean grain elevator 40 housed within a clean grain elevator housing 30. The grain is then thrown into a collection area 318. Grain is then lifted from the collection area 318 by a fountain auger 350 and is discharged into a storage container incorporated in the combine such as a grain tank 320. The grain is subsequently conveyed by a cross-auger 322 to an unloading auger 330, which discharges the grain into a grain cart, wagon, truck or other vehicle for transporting for further processing or storage.

Figure 2:
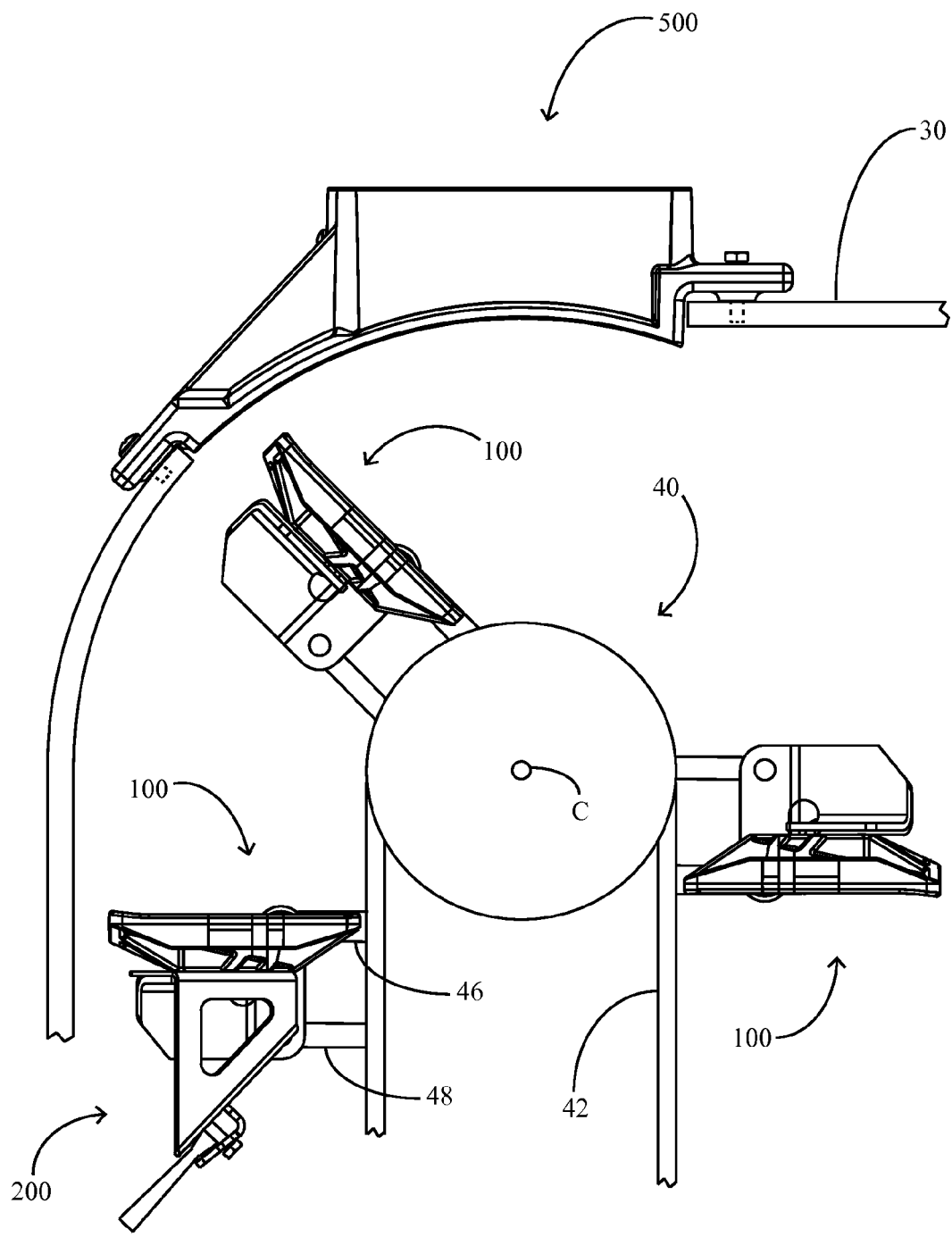
FIG. 2 is a cut away view of an elevator housing of the combine and showing a side elevation view of an upper portion of the clean grain elevator and illustrating an embodiment of a yield sensor assembly and an embodiment of a paddle assembly.

FIG. 2 is a cut away view of the elevator housing 30 of the combine 300 and showing a side elevation view of an upper portion of the clean grain elevator 40. The elevator 40 comprises an elevator chain 42 driven about an upper sprocket and a lower sprocket (not shown). A series of grain paddle assemblies 100 mounted to the chain 42 collect grain from a lower portion of the elevator 40. In the embodiment of FIG. 2, the paddle assemblies 100 are mounted to the chain 42 by upper and lower brackets 46, 48; however, as described further below, in an alternative embodiment the brackets 46, 48 are omitted such that the paddle assemblies are mounted directly to the chain. The paddle assemblies 100 each include a paddle 150 (FIG. 3) which carry the grain up the height of the elevator 40 and throw it toward the collection area 318 for transfer by the fountain auger 350 as discussed above. A yield sensor assembly 500 is preferably mounted to an upper portion of the elevator housing 30. The yield sensor assembly 500 preferably comprises one of the embodiments disclosed in Applicant's co-pending U.S. Provisional Patent Application No. 61/522,153, U.S. Provisional Patent Application No. 61/644,367, U.S. Provisional Patent Application No. 61/754,948 ("the '948 application"), and/or International Patent Application No. PCT/US2012/050341, all of which are hereby incorporated herein in their entirety by reference. As each paddle 150 travels around the top of the upper sprocket, grain is impelled by centrifugal force from the surface of the paddle and contacts a lower surface of the yield sensor assembly 500. The yield sensor assembly 500 is preferably configured to generate a signal related to the resulting force on the lower portion of the yield sensor assembly.

Paddle and Brush Assemblies

Figure 3:
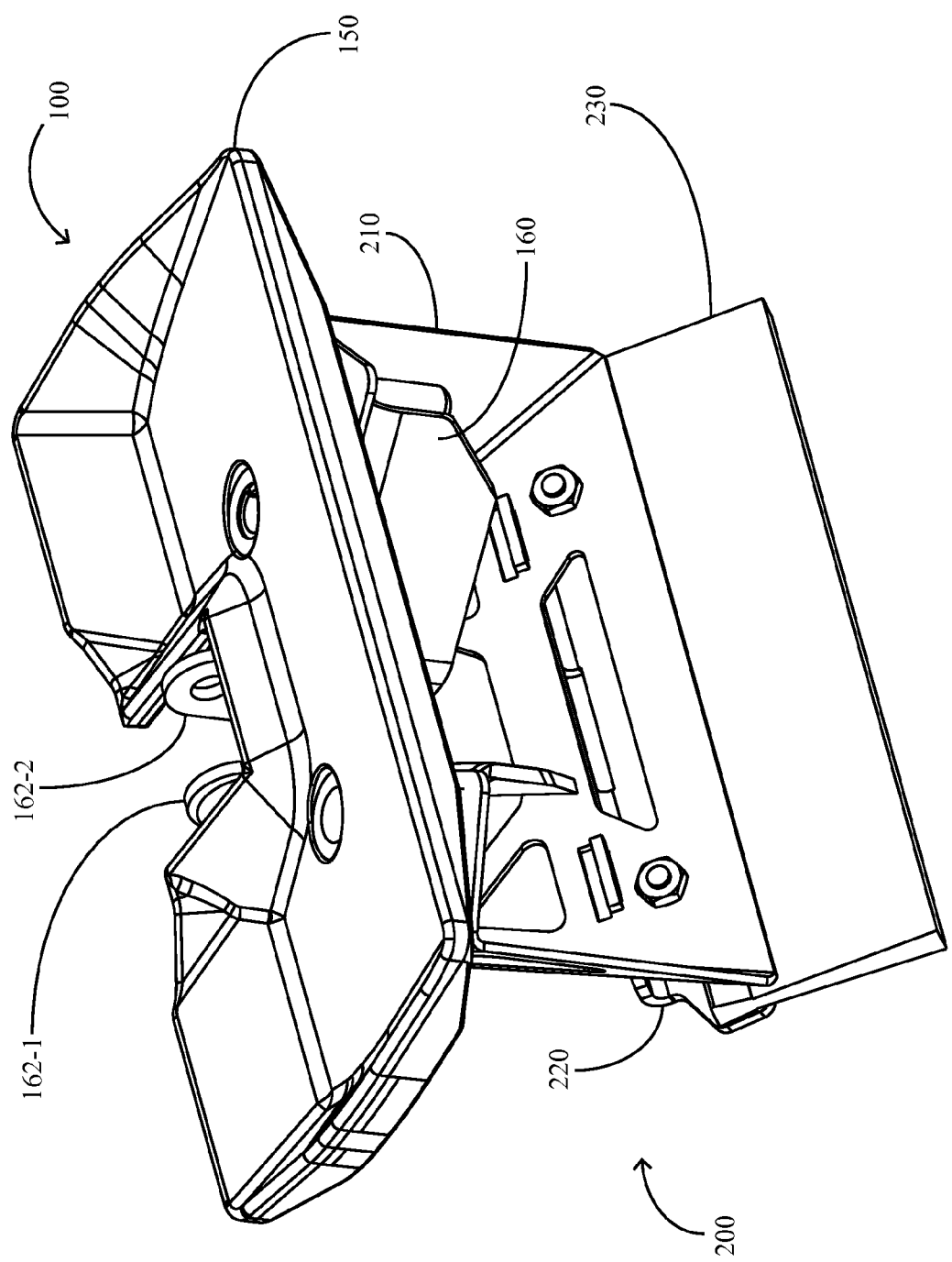
FIG. 3 is a front perspective view of an embodiment of a paddle assembly incorporating an embodiment of a brush assembly.
Figure 4:
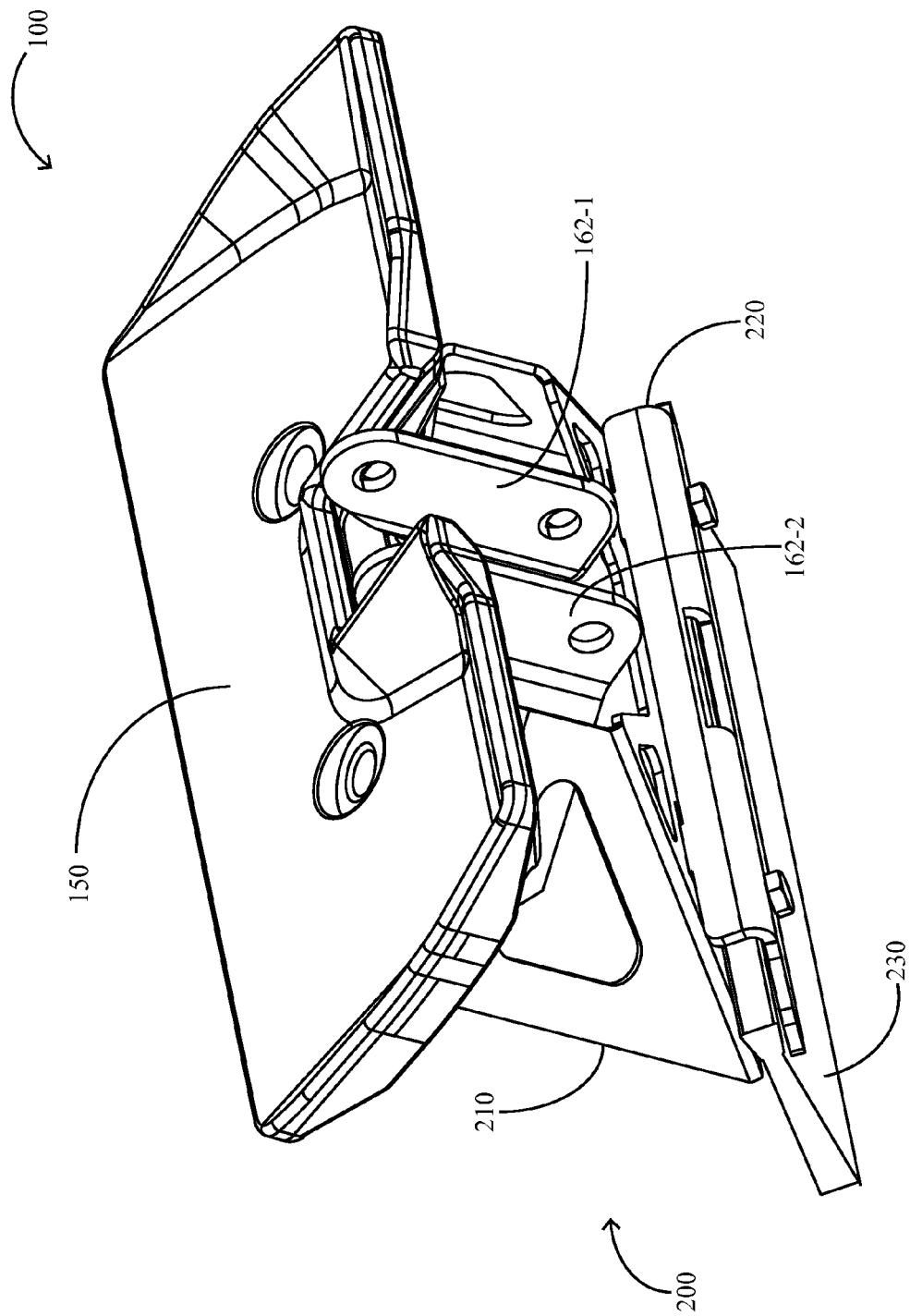
FIG. 4 is a rear perspective view of the paddle assembly and brush assembly of FIG. 3.
Figure 5:
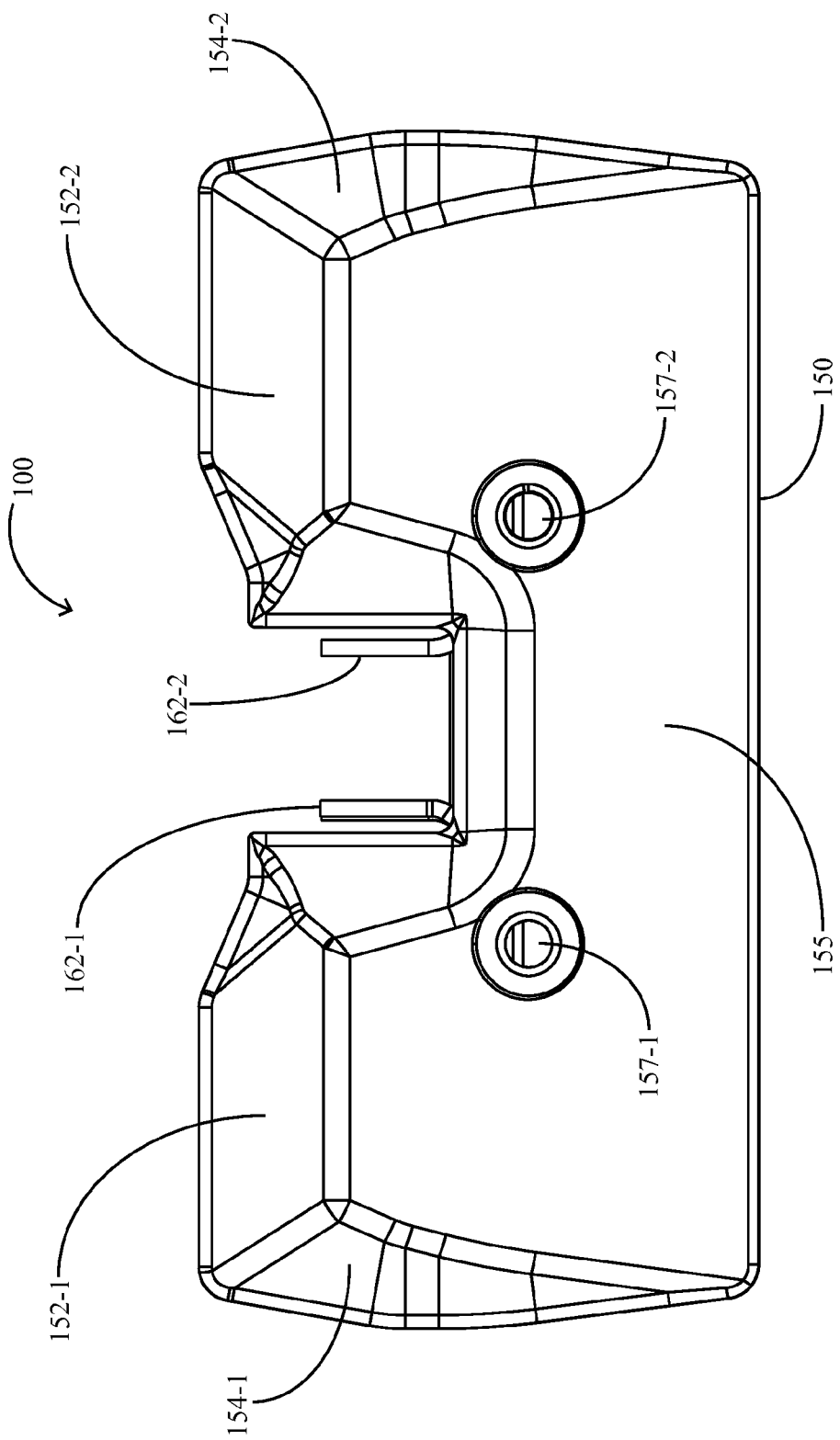
FIG. 5 is a plan view of the paddle assembly of FIG. 3.

Turning to FIGS. 3 and 4, one of the paddle assemblies 100 is illustrated in more detail. The paddle assembly 100 preferably includes a paddle 150 configured to support a pile of grain. The paddle 150 is mounted to a paddle frame 160 via bolts or other suitable connectors through mounting holes 157 (FIG. 5). The paddle frame 160 preferably includes left and right mounting portions 161-1, 162-2 configured to rigidly couple the paddle frame 160 to the elevator chain 42 via bolts (not shown) extending through the mounting portions and the chain. As illustrated in FIG. 2, a brush assembly 200 is preferably mounted to only one of the paddle assemblies 100. The brush assembly 200 preferably includes a brush frame 210 (FIG. 3) mounted at an upper end to the paddle 150. A brush clip 220 preferably secures a transversely extending brush 230 to the brush frame 220. The brush 230 is preferably comprised of stainless steel bristles. In other embodiments, the bristles may be made of another metal such as aluminum, brass, or carbon steel, or in some embodiments of a synthetic material such as carbon fiber, nylon or polyester. In still other embodiments the brush assembly 200 is replaced with another apparatus (e.g., a resilient rubber blade or a brush wheel) configured to remove foreign material from the lower surface of the yield sensor assembly 500.

Figure 6:
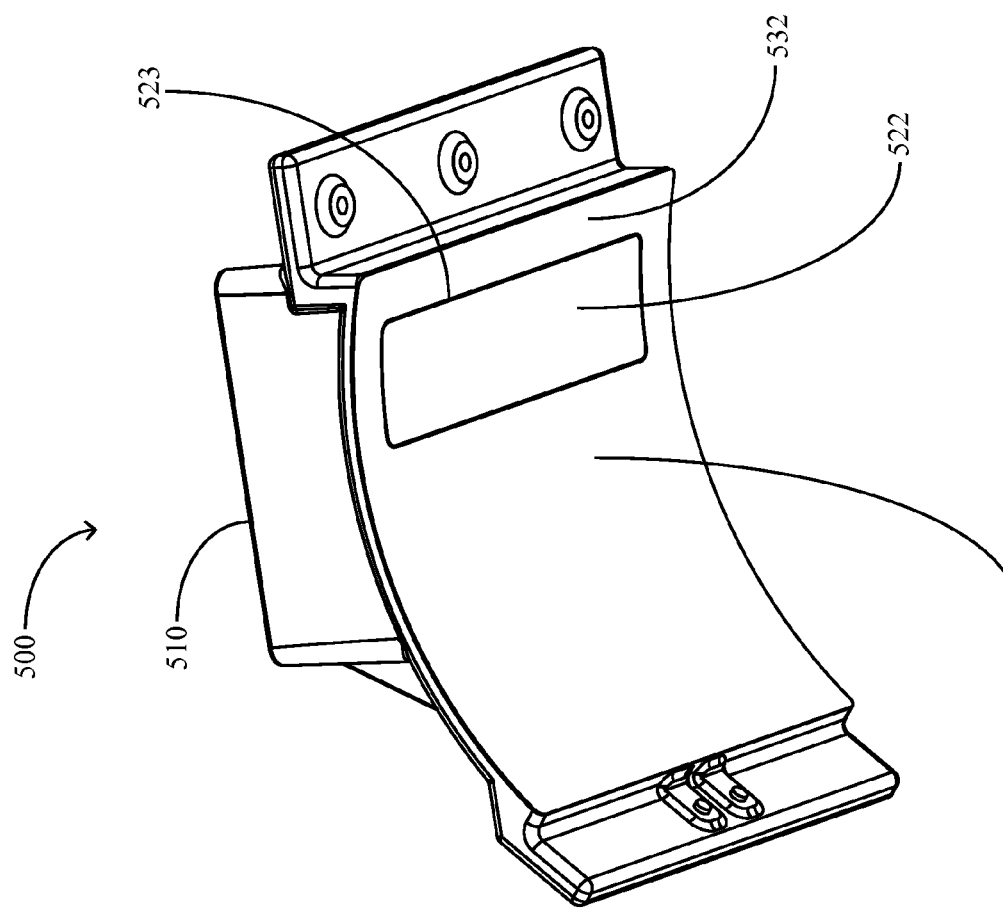
FIG. 6 is a bottom perspective view of the yield sensor assembly of FIG. 2.
Figure 7:
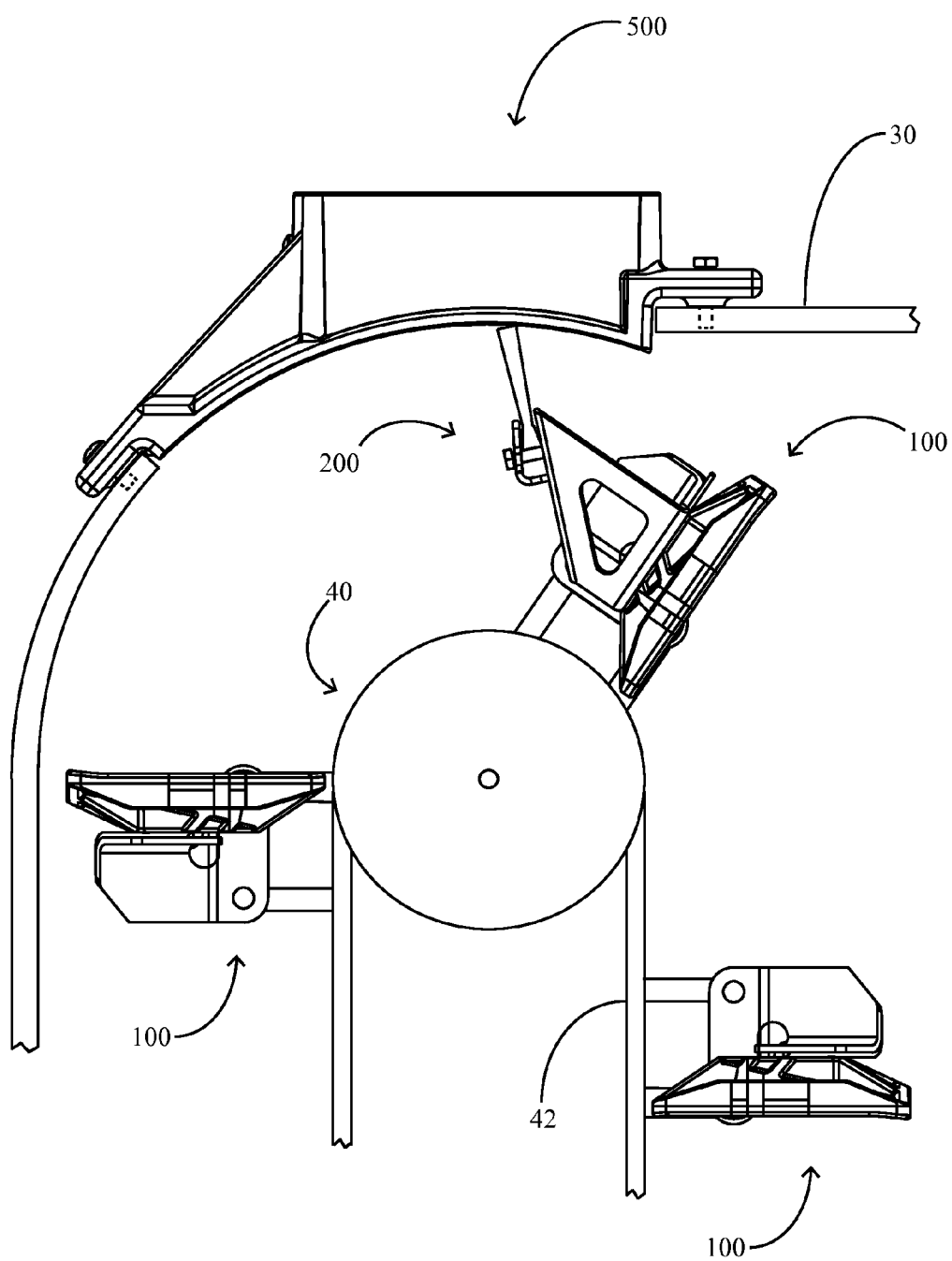
FIG. 7 is a side elevation cutaway view of a clean grain elevator incorporating the yield sensor assembly of FIG. 2 and the paddle assembly and brush assembly of FIG. 3.

Turning to FIG. 7, the elevator 40 is shown in a position advanced from that of FIG. 2 such that the paddle assembly 100 having a brush assembly 200 mounted thereto is traveling around the upper sprocket of the elevator. The paddle assembly 100 and brush assembly 200 are preferably configured such that as the brush assembly 200 travels around the upper sprocket of the elevator, the brush 230 resiliently engages a lower surface of the yield sensor assembly 500. The lower surface of the yield sensor assembly 500 is illustrated in FIG. 6. The lower surface of the yield sensor assembly 500 preferably includes a pre-sensor portion 512 and a post-sensor portion 532, both of which comprise surfaces of a housing 510 of the yield sensor assembly 500. The lower surface of the yield sensor assembly 500 further includes a sensor surface 522 mounted for resilient upward displacement. A circumferential gap 523 preferably extends between the sensor 522 and the remainder of the lower surface of the yield sensor assembly 500.

Referring to FIGS. 6 and 7, as the as the brush assembly 200 travels around the upper sprocket of the elevator 40, the brush 230 removes particles of foreign material (e.g., corn dust and/or soybean dust) from the lower surface of the yield sensor assembly 500. Specifically, as the brush 230 engages the lower surface of the yield sensor assembly 500, the brush removes foreign material from the sensor surface 522 and from the gap 523. In the installed position, the transverse width of the brush 230 is preferably greater than the transverse width of the gap 523 and greater than the transverse width of the sensor surface 522.

In another embodiment, the brush assembly 200 is mounted directly to the chain 42 rather than to the paddle assembly 100. In such an embodiment the brush assembly 200 is preferably also disposed and configured to contact the lower surface of the yield sensor assembly 500 and to remove foreign material from the sensor surface 522 and from the gap 523.

Turning to FIG. 5, the paddle 150 is illustrated in more detail. The paddle 150 preferably includes base surface 155 and left and right rear catch surfaces 152-1, 152-2. The base surface 155 and the rear catch surfaces are preferably sloped to meet along an axis defining a trough of the upper surface of the paddle 150. The base surface 155 is preferably longer (e.g., between three and five times longer) than the rear catch surfaces 152 along the travel direction. The travel-direction slope of the rear catch surfaces 152 is preferably steeper than the travel-direction slope of base surface 155. The paddle 150 preferably includes left and right side catch surfaces 154-1, 154-2. The side catch surfaces 154 are preferably sloped downward in the inboard direction. The transverse width of each side catch surface 154 preferably decreases as the catch surface extends from the rear catch surface 152 to a forward lip of the base surface 155. The side catch surfaces 154, the rear catch surfaces 152 and the base surface preferably define a cavity configured to retain a pile of grain as the paddle 150 ascends the clean grain elevator. In other embodiments, the paddle 150 is replaced with one of the paddle embodiments described in the '948 application.

Yield Measurement Systems

Figure 8:
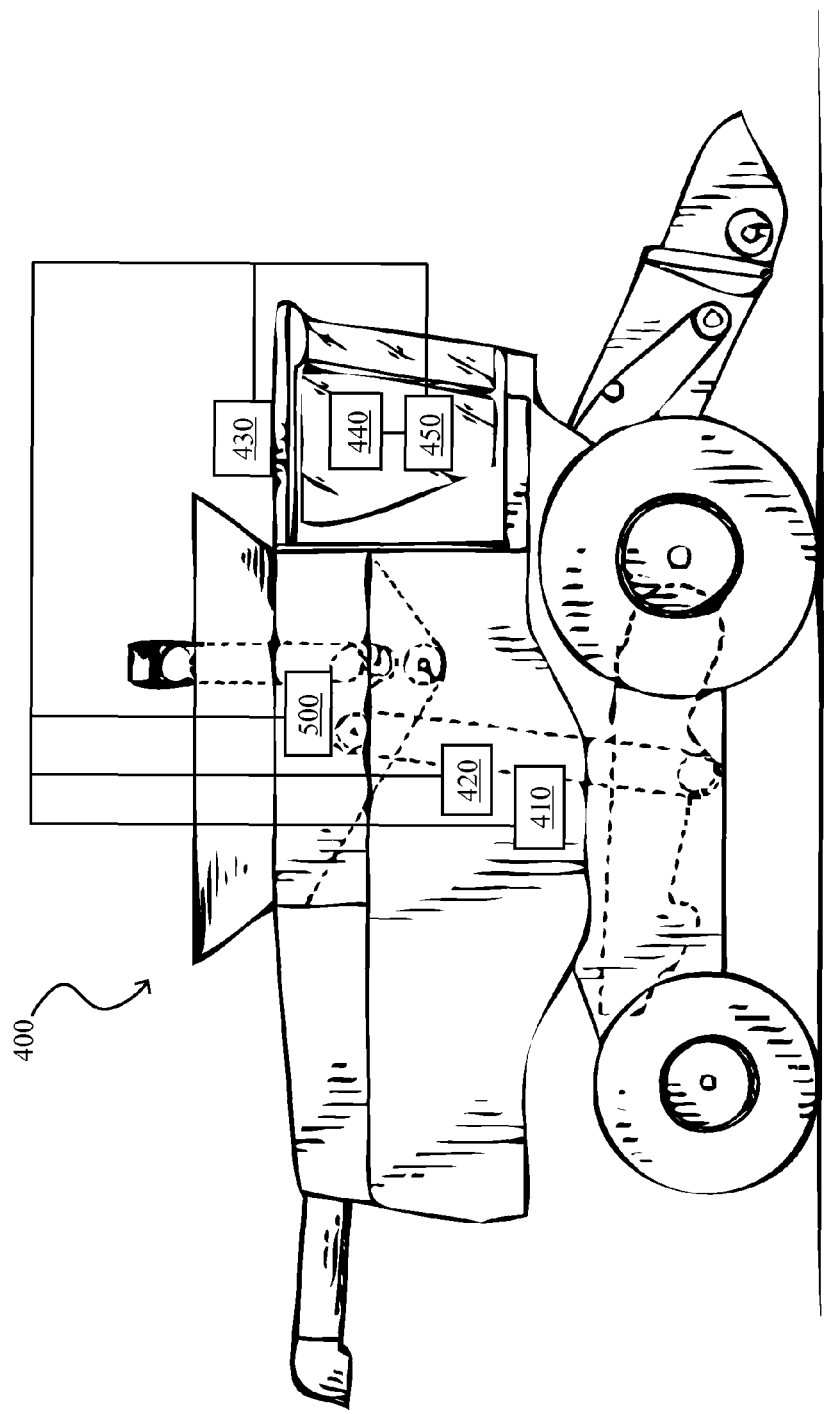
FIG. 8 schematically illustrates an embodiment of a yield sensor system.

A yield measurement system 400 is illustrated in FIG. 8 schematically superimposed on a combine 300. The yield measurement system 400 preferably includes the yield sensor assembly 500. As discussed elsewhere herein, the yield sensor assembly 500 is preferably mounted to the clean grain elevator housing above the clean grain elevator. The yield measurement system 400 preferably further includes a grain height sensor 410, a moisture sensor 420, a global positioning receiver 430, a graphical user interface 440, and a processing board 450.

The grain height sensor 410 preferably comprises a sensor configured and disposed to measure the height of grain being lifted by the clean grain elevator. The grain height sensor 410 is preferably mounted to the sides of the clean grain elevator housing 30 adjacent the location where grain piles are lifted vertically before reaching the top of the clean grain elevator 40. The grain height sensor is preferably disposed below the center C of upper sprocket such that the measured grain piles have not been deformed by turning of the flights 32 about the upper sprocket. In some embodiments, the grain height sensor 410 comprises an optical transmitter configured to emit a beam toward a receiver disposed opposite the passing grain piles. The receiver is preferably in electrical communication with the processing board 450. In some embodiments, the grain height sensor 410 comprises a commercially available grain height sensor such as that used in the 8000i Yield Monitor available from Loup Electronics in Lincoln, Nebr. It should be appreciated that the grain height sensor 410 is not required for operation of the yield monitoring system 400 or the yield sensor assembly 500.

The moisture sensor 420 preferably comprises a sensor disposed to measure the moisture of grain being lifted by the clean grain elevator 40. For example, in some embodiments the moisture sensor 420 comprises a capacitive moisture sensor such as that disclosed in U.S. Pat. No. 6,285,198, the disclosure of which is hereby incorporated by reference herein in its entirety. The moisture sensor 420 is preferably mounted to the side of the clean grain elevator housing 30 adjacent the location where grain piles are lifted vertically before reaching the top of the clean grain elevator 40. The moisture sensor 420 is preferably in electrical communication with the processing board 450.

The global positioning receiver 430 preferably comprises a receiver configured to receive a signal from the global positioning system (GPS) or similar geographical referencing system. The global positioning receiver 430 is preferably mounted to the top of the combine 300. The global positioning receiver 430 is preferably in electrical communication with the processing board 450.

The processing board 450 preferably comprises a central processing unit (CPU) and a memory for processing and storing signals from the system components 410, 420, 500, 430 and transmitting data to the graphical user interface 440.

The graphical user interface 440 preferably comprises a central processing unit (CPU), a memory and interactive display interface operable to display yield measurements and yield maps to the operator and to accept instructions and data from the operator. The graphical user interface 440 is preferably mounted inside the cab 312 of the combine 300. The graphical user interface 440 is preferably in electrical communication with the processing board 450.

Yield Measurement Methods

Figure 9:
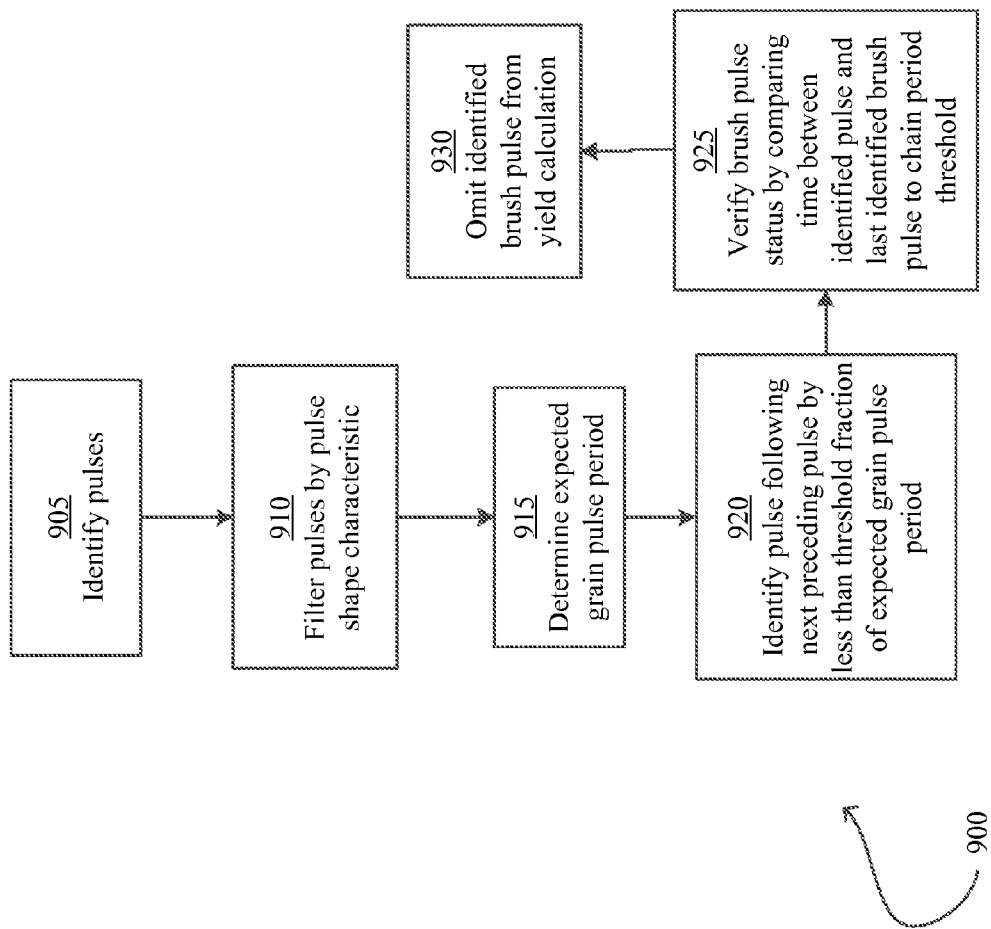
FIG. 9 illustrates an embodiment of a process for identifying brush pulses.
Figure 10:
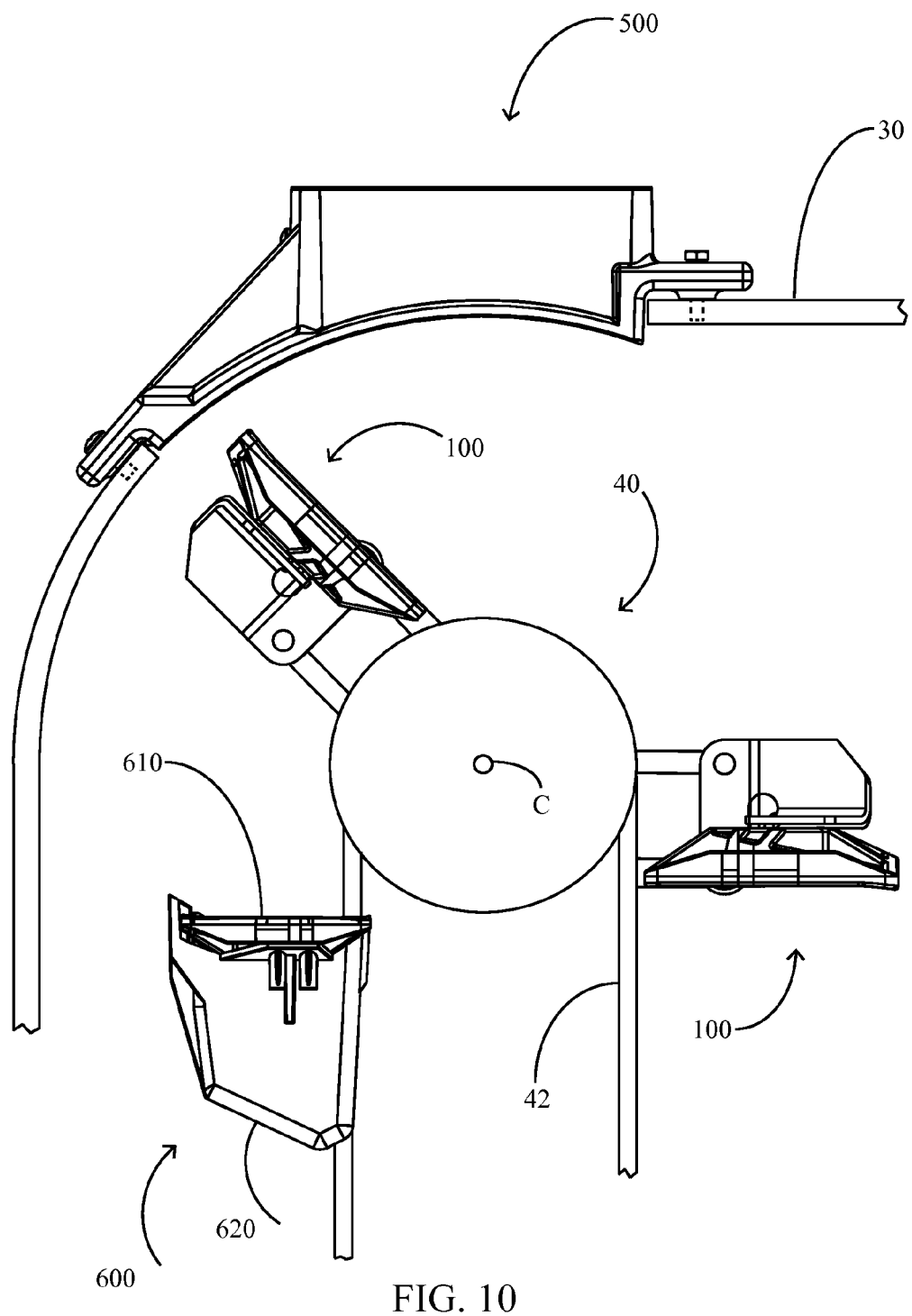
FIG. 10 is a side elevation view of a clean grain elevator incorporating an embodiment of a paddle pulse assembly.
Figure 11:
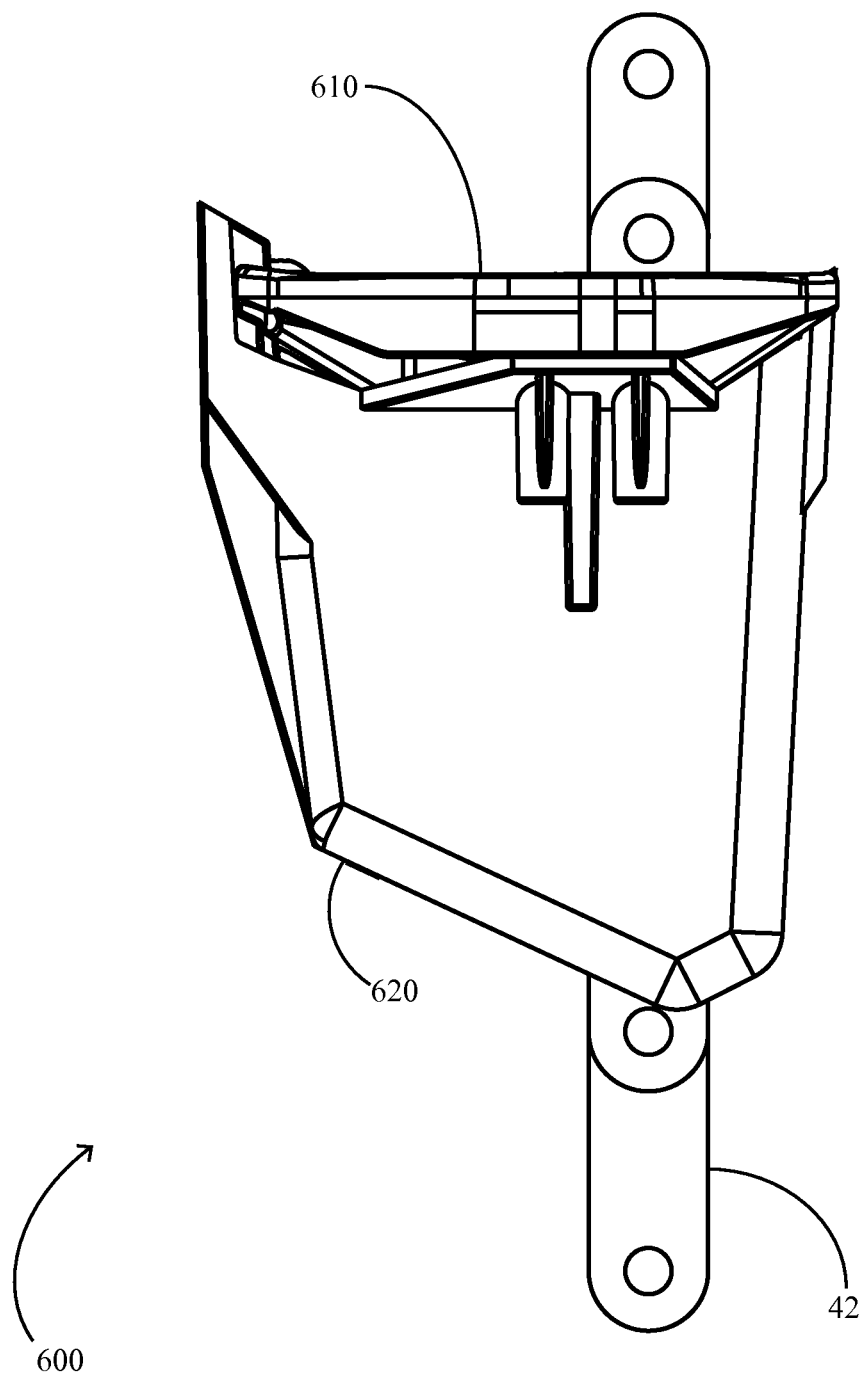
FIG. 11 is a side elevation view of the paddle pulse assembly of FIG. 10.
Figure 12:
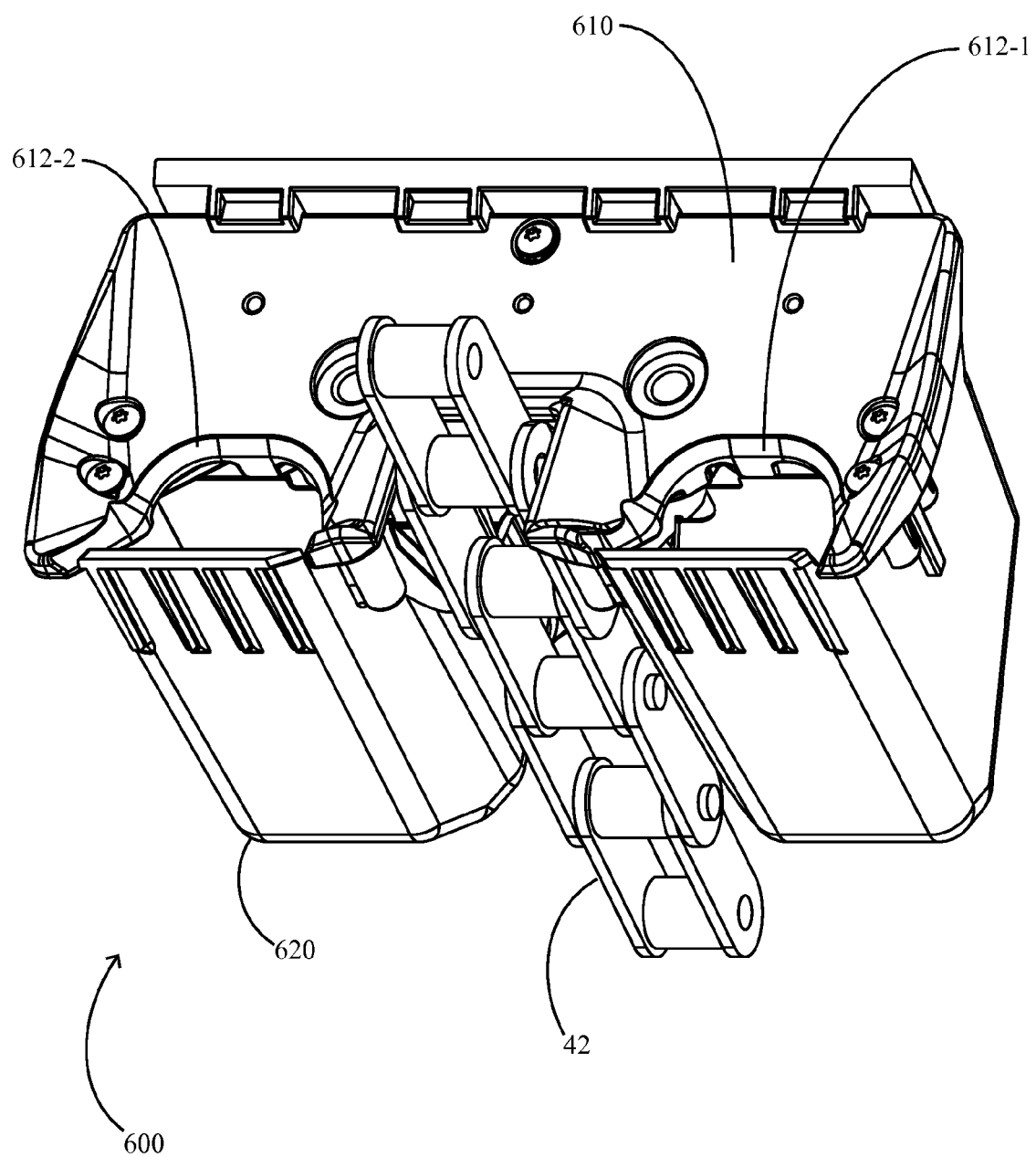
FIG. 12 is a perspective view of the paddle pulse assembly of FIG. 10.
Figure 13:
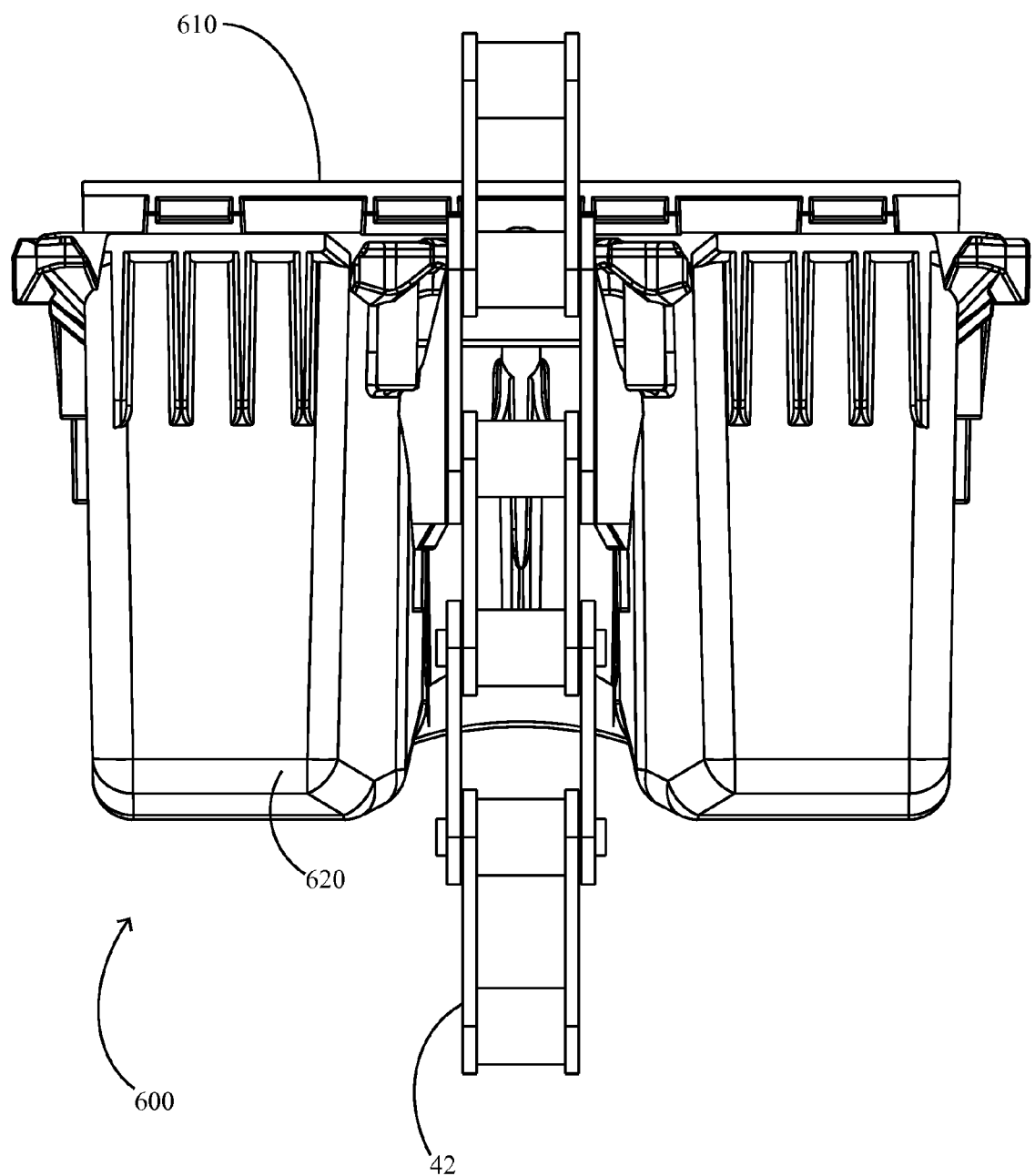
FIG. 13 is a front elevation view of the paddle pulse assembly of FIG. 10.

The yield measurement system 400 is preferably configured to measure yield of a crop being harvested as described in the applications previously incorporated by reference above. In the embodiments of the paddle assemblies 100 including the brush assembly 200 or a similar apparatus configured to clean and remove foreign material from the sensor surface 522, the yield measurement system 400 is also preferably configured to identify signal pulses caused by contact between the brush 230 and the sensor surface and omit such signal pulses from subsequent yield calculations. A process 900 for identifying and omitting brush signal pulses is illustrated in FIG. 9. At step 905, the system 400 preferably identifies a plurality of pulses in the signal generated by the yield sensor assembly 500, e.g., by identifying portions of the signal in which the signal amplitude exceeds a minimum pulse threshold. At step 910, the system 400 preferably filters the identified pulses by pulse shape characteristic, e.g., by filtering out pulses having a pulse period greater than or less than a predetermined range. At step 915, the system 400 preferably determines an expected grain pulse period, i.e., the expected period between peaks of pulses. In some embodiments, the expected grain pulse period is determined by identifying a plurality of sequential pulses for which the periods between pulse peaks are substantially equal (e.g., such that a ratio between any of the pulses is within a threshold range, such as between 0.9 and 1.1). At step 920, the system 400 preferably identifies a suspected brush pulse by identifying a pulse following the next preceding pulse by less than a threshold fraction (e.g., 50%) of the expected grain pulse period determined at step 915. At step 925, the system 400 preferably verifies the brush pulse status of the suspected brush pulse by comparing a chain period threshold to the time between the suspected brush pulse and the last identified brush pulse. In embodiments including a single brush assembly 200, the chain period threshold is preferably related to the time required for the brush assembly to rotate by a full rotation. The chain period threshold may be a constant value (e.g., 2 seconds) or may be calculated based on the travel speed or engine speed of the combine 300. At step 930, the system 400 preferably omits the identified brush pulse from yield calculations, e.g., by using filtered pulses other than the identified brush pulse to calculate yield based on the signal.

Property Pulse Assemblies

Referring to FIGS. 10-16, a property pulse assembly 600 is illustrated. The property pulse assembly 600 is preferably configured to gather clean grain and release the gathered clean grain against the yield sensor assembly 500 with a force related to a grain property of the gathered clean grain. In a preferred embodiment, the clean grain gathered by the property pulse assembly 600 is released against the yield sensor assembly 500 with a force related to viscosity of the clean grain; as used herein, "viscosity" should be understood to be related to the flowability of kernels of grain over one another.

Figure 14:
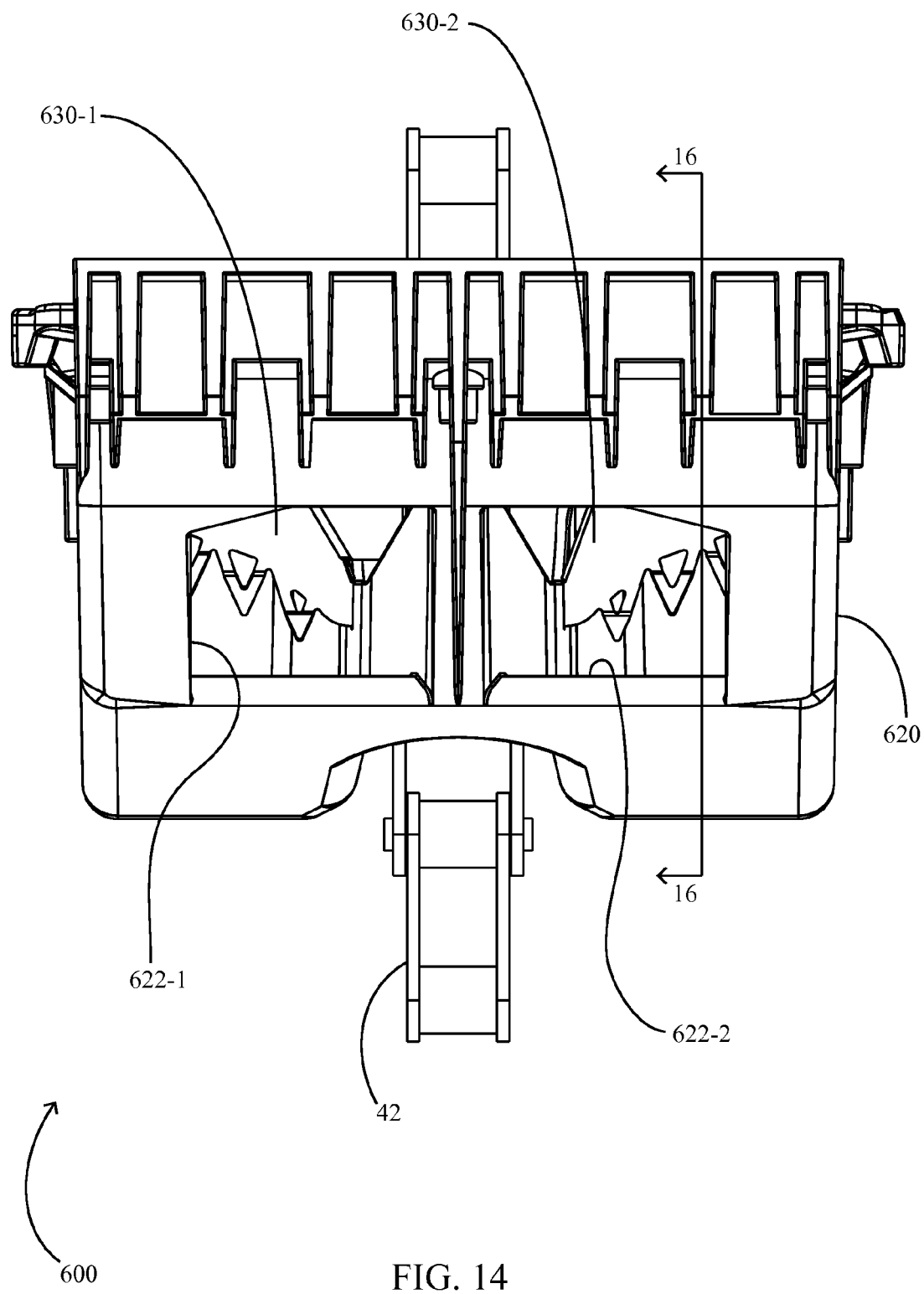
FIG. 14 is a rear elevation view of the paddle pulse assembly of FIG. 10.
Figure 15:
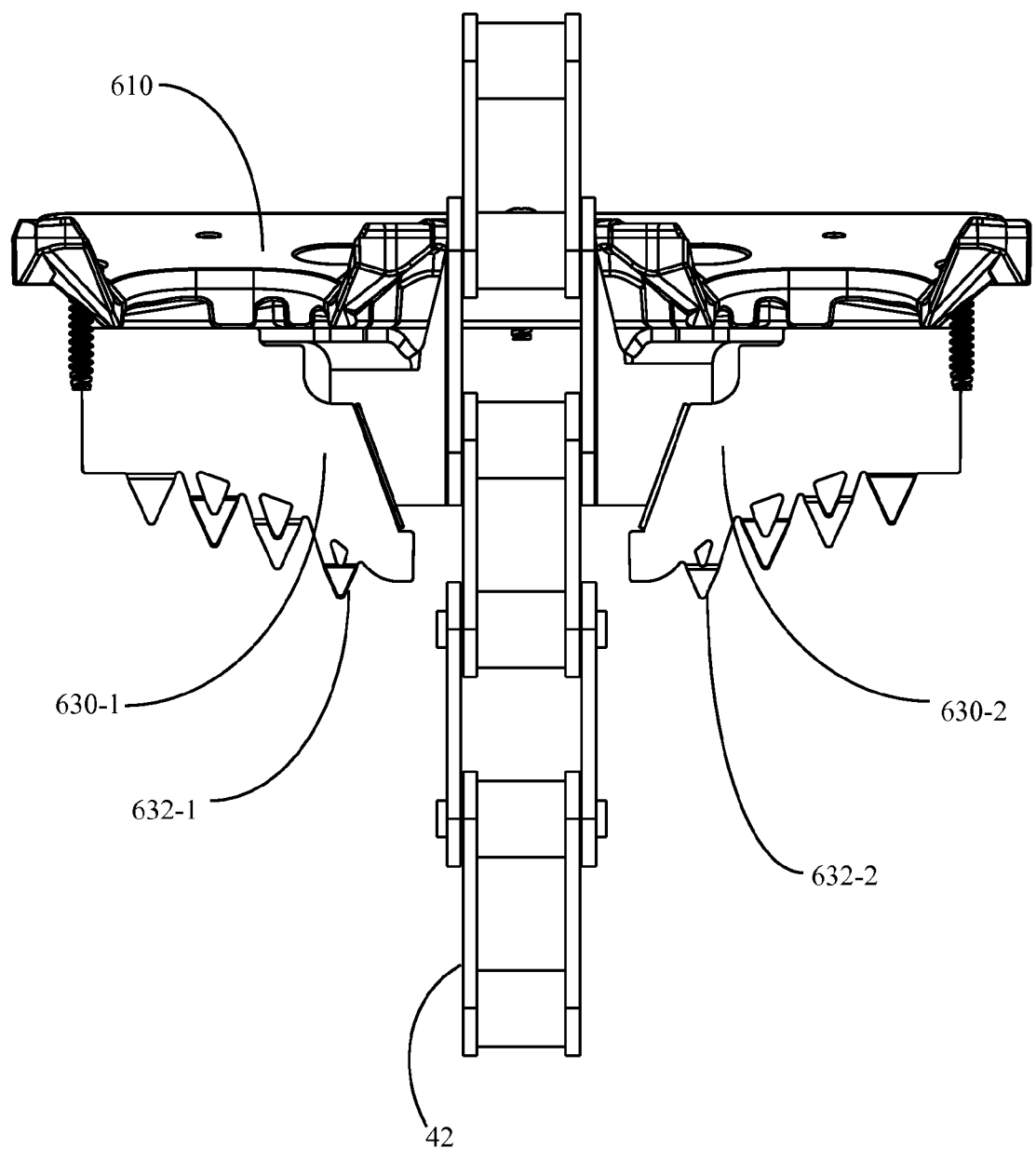
FIG. 15 is a front elevation view of the paddle pulse assembly of FIG. 10 with a bucket not illustrated.
Figure 16:
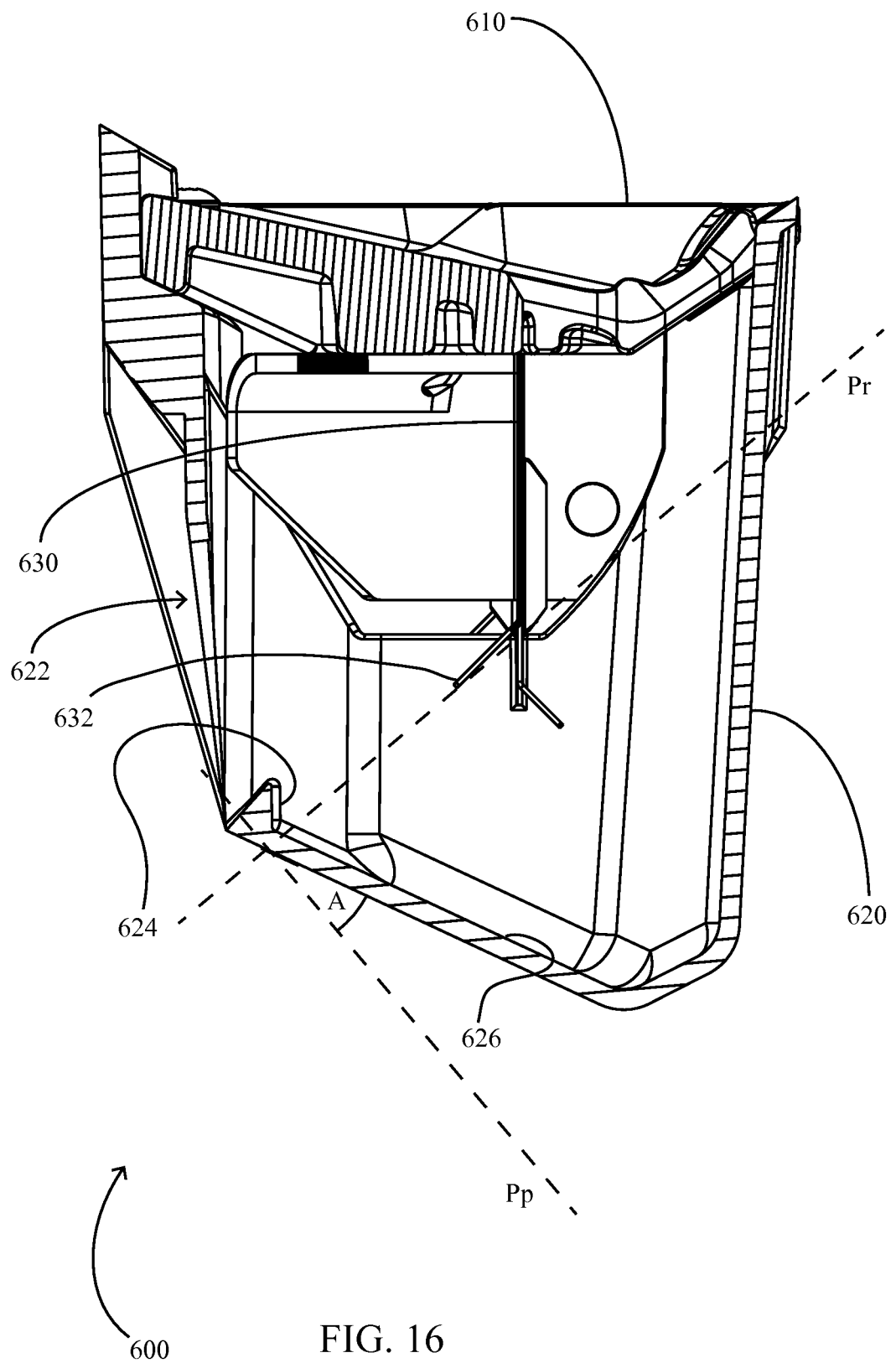
FIG. 16 is a cross-sectional view of the paddle pulse assembly of FIG. 10 along the section 16-16 of FIG. 14.

The property pulse assembly 600 is preferably mounted to the chain 42. The property pulse assembly 600 preferably includes a paddle 610 and a bucket 620. The paddle 610 preferably includes a plurality of apertures 612 (FIG. 12) allowing grain to flow into the bucket. The assembly 600 preferably includes a plurality of baffles 630 (FIGS. 14-16). Each baffle 630 is preferably disposed to extend vertically into the bucket 620 when the bucket is in the vertical orientation of FIG. 16. Each baffle 630 preferably has a bottom end which tapers downward in an inboard direction. A plurality of teeth 632 is preferably laterally arranged along the bottom end of each baffle; the teeth 632 are preferably alternately tipped to the left and right along the view of FIG. 16. The bucket 620 preferably includes a plurality of apertures 622 disposed to face the yield sensor assembly 500 when the bucket travels around the top of the elevator 30.

In operation, as the chain 42 moves the assembly 600 through collected clean grain at the bottom of the clean grain elevator 30, grain is collected in the bucket 620 through the apertures 612. As the bucket 620 rises up the elevator 30, the grain comes to rest at the bottom of the bucket 620 on a lower interior surface 626 of the bucket. As the bucket 620 moves along a generally semicircular path about the upper sprocket of the elevator 30, grain preferably exits the bucket via the apertures 622 by centripetal acceleration. As the bucket 620 moves along the semicircular path about the upper sprocket, the surface 626 is preferably disposed at an angle A from a plane Pp lying perpendicular to a plane Pr extending radially from the center C of the upper sprocket. The angle A is preferably approximately equal to or greater than the angle of repose of the grain such that the grain flows out of the apertures 622. In a preferred embodiment in which the grain is corn, the angle A is preferably at least 25 degrees. A lip 624 is preferably disposed at a first end of the surface 626 adjacent to the apertures 622. The lip 624 preferably has a sufficient height to prevent a layer of grain contacting the surface 626 from sliding along the surface 626 and out of the apertures 622. Thus grain is preferably constrained to flow out of the apertures 622 by flowing over other grain. As grain exits the openings, it contacts the yield sensor assembly 500 and generates a pulse in the signal generated by the yield sensor assembly. The force with which the grain contacts the yield sensor assembly 500 is preferably related to the viscosity. The baffles 630 preferably restrict the amount of grain exiting the bucket as the assembly 600 rounds the top of the elevator. As the bucket 620 descends the elevator, grain preferably drops from the bucket via the apertures 612.

Figure 17:
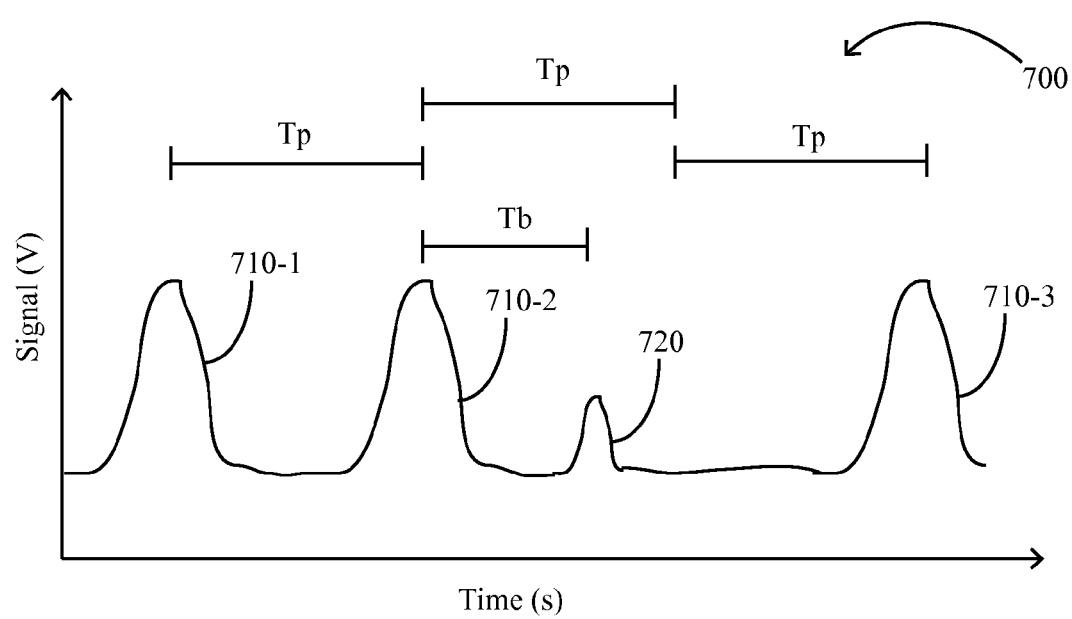
FIG. 17 illustrates a portion of an exemplary yield sensor signal.

Turning to FIG. 17, a signal 700 generated by the yield sensor assembly is illustrated having a plurality of paddle pulses 710 generated as the paddle assemblies 100 pass the yield sensor assembly 500. The paddle assemblies 100 are preferably regularly spaced along the chain 42 such that at a constant elevator speed (or in a signal corrected for elevator speed) the paddle pulses 710 are spaced at a regular period Tp. The signal 700 preferably includes one or more property pulses generated as the property pulse assemblies 600 pass the yield sensor assembly 500. The property pulse assembly 600 is preferably disposed at an offset position along the chain such that at a constant elevator speed (or in a signal corrected for elevator speed) the property pulses 720 are spaced at a different period Tb from an adjacent paddle pulse 710. The period Tb is preferably approximately one half of the period Tp.

Figure 18:
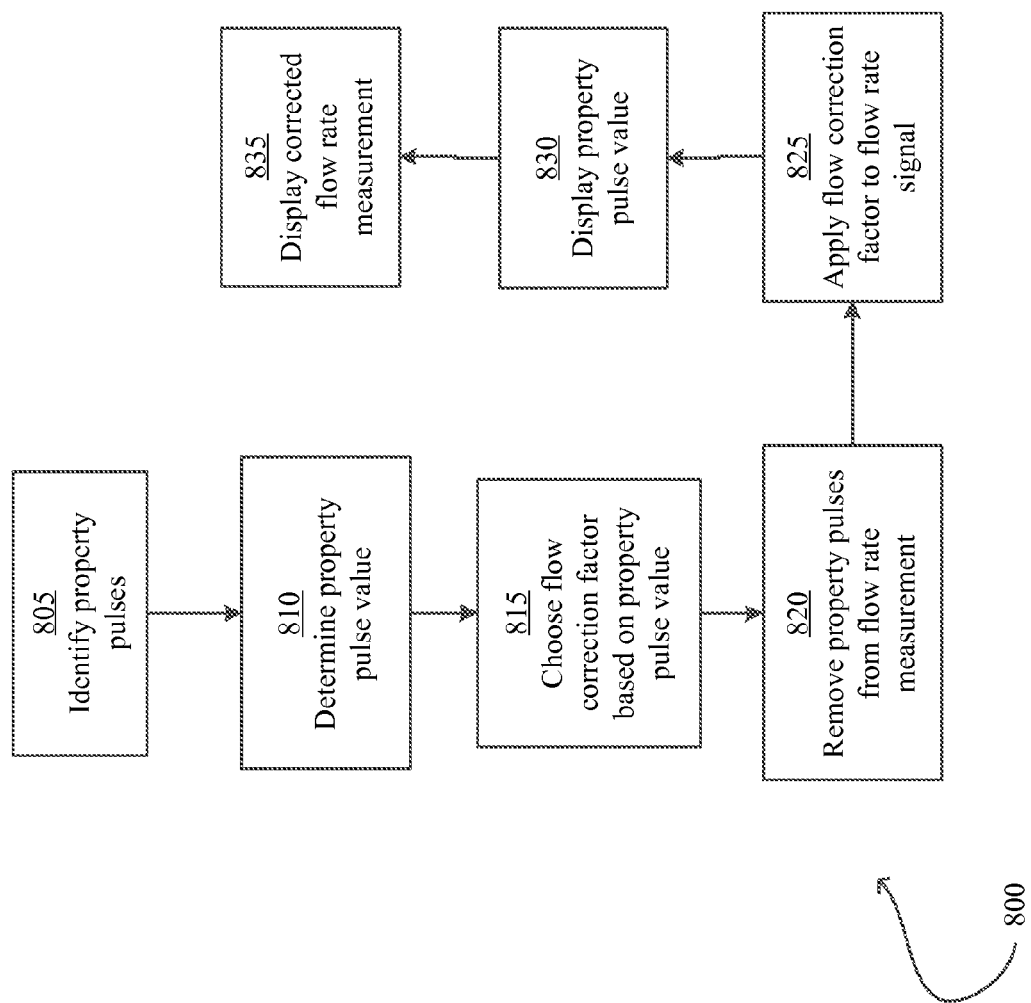
FIG. 18 illustrates an embodiment of a process for correcting a yield measurement using a property pulse.
Figure 19:
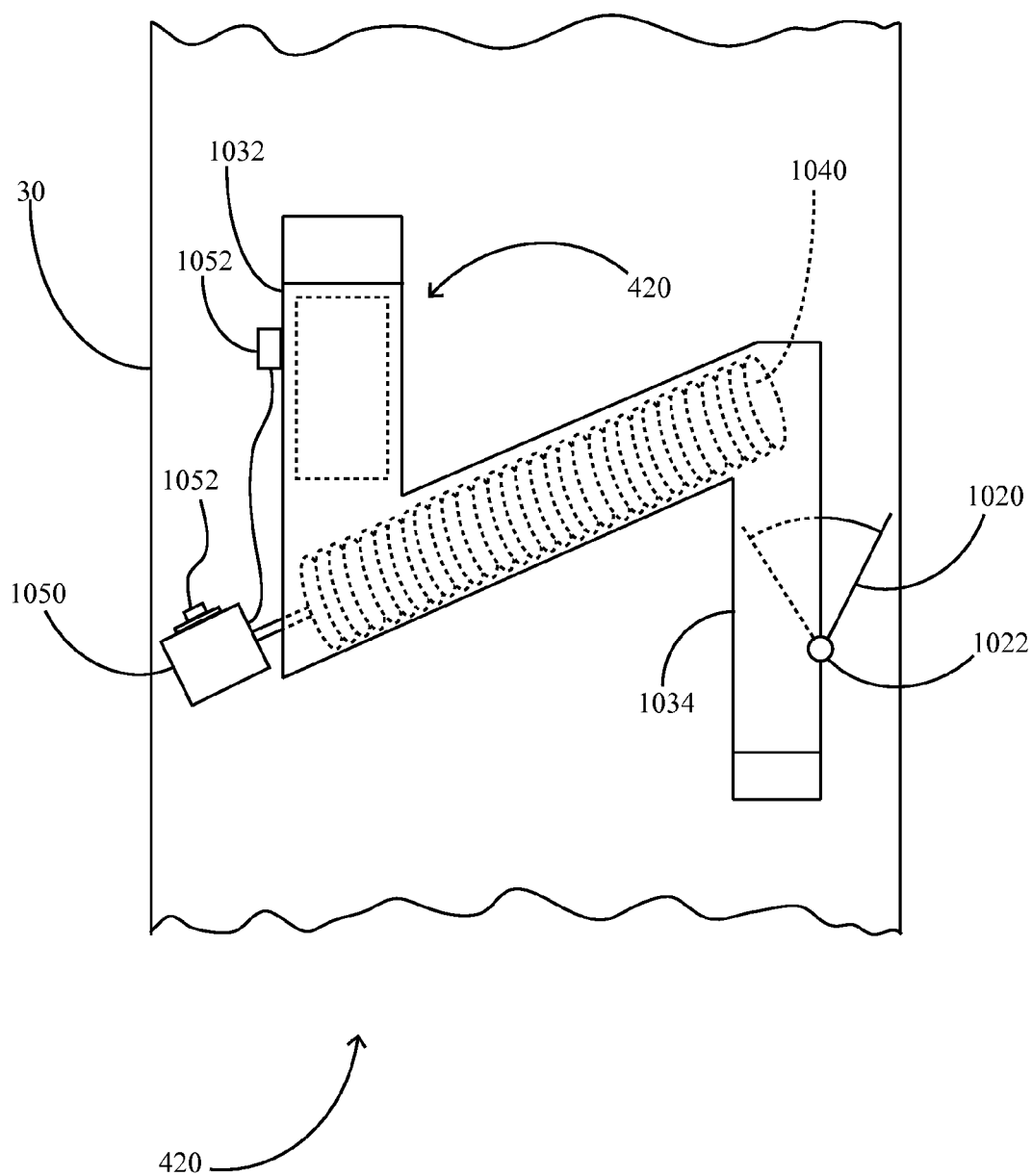
FIG. 19 is a side elevation view of an embodiment of a grain measurement system.

A process 800 for correcting a flow rate measurement based on the property pulses 720 is illustrated in FIG. 18. At step 805, the system 400 preferably identifies the property pulses 720 in the signal 700, e.g., by identifying pulses separated from any neighboring pulses by the period Tb. At step 810, the system 400 preferably determines a property pulse value related to the strength of the property pulse (or a plurality of property pulses); in some embodiments, the property pulse value may be a maximum value, a mean value, or an average value of the property pulse. At step 815, the system 400 chooses a flow correction factor (or in some embodiments one of a plurality of flow correction factor correlation curves) based on the value of the property pulse. At step 820, in some embodiments the system 400 removes the property pulses 720 from the flow rate signal 700 such that the baseline flow rate measurement (i.e., the flow rate measurement made before applying the flow correction factor) does not reflect the property pulse. At step 825, the system 400 preferably applies the flow correction factor to the flow rate signal 700. At step 830, the system 400 preferably graphically or numerically displays the property pulse value. At step 835, the system 400 preferably displays a corrected flow rate measurement based on the corrected flow rate signal.

Grain Measurement

In some embodiments, the system 400 includes a grain measurement system 1000 preferably mounted to the side of the clean grain elevator 30. In operation, grain falls to one side of the rising paddle assemblies 100 through a first opening (not shown) in the grain elevator 30 into a first chute 1032. The moisture (or another property) of grain in the first chute 1032 is measured by the moisture sensor 420 (or another grain property sensor). When grain collected in the first chute 1032 exceeds the height of an optical (or capacitive) limit sensor 1052 disposed on the first chute, the limit sensor sends a signal to an auger motor 1050 commanding the motor to drive an auger 1040. The auger 1040 transfers grain to a second chute 1034, where the grain falls by gravity through a second opening (not shown) back into the clean grain elevator 30; the second opening is preferably in the portion of the elevator in which paddles are descending. A sampler 1020 is preferably pivotally mounted to the second chute 1034; when grain is falling from the auger 1040 through the second chute, the sampling chute preferably fills with grain when rotated into the chute. The operator preferably rotates the sampler 1020 into the second chute to obtain a sample of grain and then rotates the sampler in the opposite direction to remove the sampler from the second chute and obtain or make measurements (e.g., moisture measurements) of the sampled grain. In some embodiments the grain measurement system 1000 includes an override switch 1050 in electrical communication with the motor 1050; engagement of the override switch preferably causes the motor to drive the auger 1040 (regardless of the state of the limit switch 1052) such that grain is dropped into the second chute 1034.

In other embodiments, the sampler 1020 is mounted directly to the side of the clean grain elevator 30 and disposed to capture a sample of grain falling from the side of the paddle assemblies 100 as the paddle assemblies ascend the clean grain elevator.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An apparatus for monitoring a mass flow rate of harvested grain in a combine having a clean grain elevator including a clean grain elevator chain, comprising:
    a sensor surface;
    a sensor disposed to measure displacement of said sensor surface;
    a plurality of paddles mounted to said clean grain elevator chain;
    a bucket mounted to said clean grain elevator chain, wherein said bucket releases grain, and wherein said released grain contacts said sensor surface; and
    processing circuitry in data communication with said sensor, said processing circuitry configured to estimate a flow rate of grain based on a signal generated by said sensor, wherein said processing circuitry is further configured to distinguish a property pulse from a plurality of paddle pulses, said property pulse being generated when grain released by said bucket contacts said sensor surface, said paddle pulses being generated when grain released by said plurality of paddles contacts said sensor surface.

2. The apparatus of claim 1, wherein a force with which said released grain contacts said sensor surface is related to a property of said grain.

3. The apparatus of claim 1, wherein a force with which said released grain contacts said sensor surface is related to a viscosity of said grain.

4. The apparatus of claim 1, wherein a force with which said released grain contacts said sensor surface is related to a flowability of said grain.

5. The apparatus of claim 1, wherein said bucket comprises:
    a lower surface on which a first layer of grain is collected, wherein additional grain collected by said bucket rests on top of said first layer, wherein said lower surface is disposed such that said additional grain flows across said first layer of grain before being released by said paddle.

6. The apparatus of claim 5, wherein said lower surface is disposed at an angle A from a plane Pp lying perpendicular to a plane Pr extending radially from the center C of an upper sprocket of the clean grain elevator, and wherein said angle A is at least about an angle of repose of said grain.

7. The apparatus of claim 5, wherein said lower surface is disposed at an angle A from a plane Pp lying perpendicular to a plane Pr extending radially from the center C of an upper sprocket of the clean grain elevator, and wherein said angle A is at least about 25 degrees.

8. The apparatus of claim 5, further including:
    a lip adjacent to said lower surface, said lip preventing said first layer of grain from sliding out of said bucket as said bucket rounds an upper end of the clean grain elevator chain.

9. The apparatus of claim 2, further including a baffle restricting an amount of grain released by said bucket.

10. The apparatus of claim 1, wherein said processing circuitry is further configured to modify said estimated flow rate based on a property of said property pulse.

11. The apparatus of claim 1, further comprising:
    a brush mounted the clean grain elevator and disposed to contact said sensor surface.

12. The apparatus of claim 11, wherein said processing circuitry is further configured to identify a brush pulse, said brush pulse being generated when said brush contacts said sensor surface.

13. The apparatus of claim 12, wherein said processing circuitry is further configured to omit said brush pulse in calculating said estimated flow rate.

\* \* \* \* \*